A. B. McFARLAN.
Car Brake.
No. 6,355.
Patented Apr. 17, 1849.
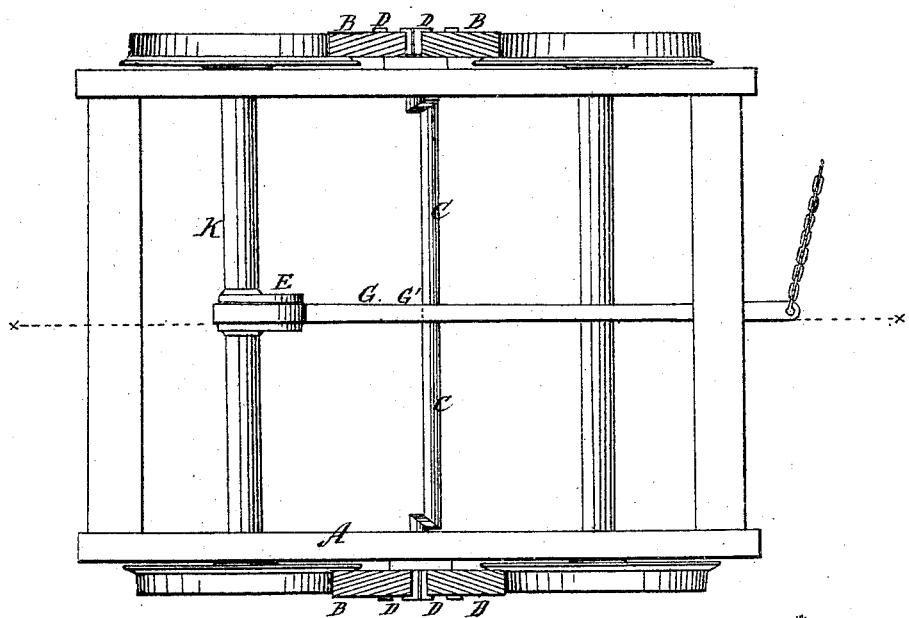
Fig. 1.
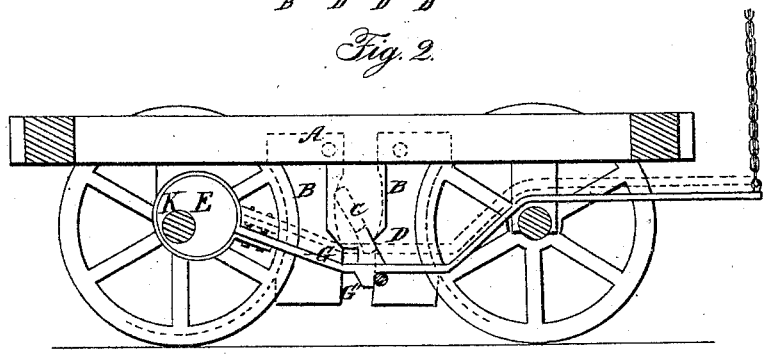
Fig. 2.
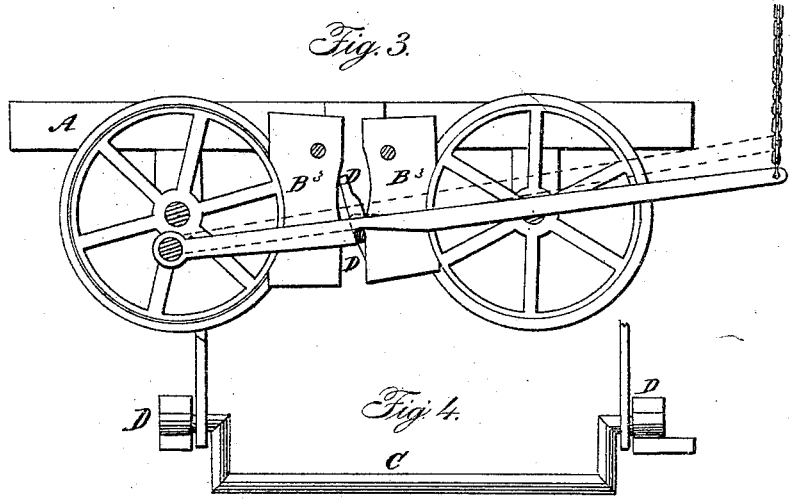
Fig. 3.
Fig. 4.

UNITED STATES PATENT OFFICE.

AMOS B. McFARLAN, OF DOWNINGTOWN, PENNSYLVANIA.

CARRIAGE-BRAKE.

Specification of Letters Patent No. 6,355, dated April 17, 1849.

*To all whom it may concern:*

Be it known that I, AMOS B. McFARLAN, of Downingtown, in the county of Chester and State of Pennsylvania, have invented a new and useful Brake for Retarding the Motion of Railroad-Cars, which is described as follows, reference being had to the annexed drawings of the same, making part of this specification.

Figure 1, is a top view of the four wheeled car and of the brake as applied to it, the brake being represented as in action; Fig. 2, is a vertical longitudinal section of the same on the line *x x* of Fig. 1, showing the brake in action the dotted lines show the position of the connecting rod when the brake is not in action; Fig. 3 is a side elevation of a modification of the improvement when in action, the dotted lines show the position of the connecting rod in this modification of the improvement, when not in action; Fig. 4 is an elevation of the crank shaft and arms.

Similar letters in the several figures refer to corresponding parts.

The car A, the pendant rubbers B B for rubbing against the peripheries of the car wheels, when the brake is in action, and the crank axle C and arms D. D, for moving the rubbers on their centers from each other and bringing them against the wheels, are made and arranged in the usual manner, the arms being placed between the rubbers.

My invention and improvement consists in a novel mode of combining and applying the eccentric wheel E and connecting rod G, in connection with the axle of the car on which the eccentric is fixed for turning the crank axle C, and arms D that bring the rubbers B in contact with the peripheries of the wheels by the revolving of the eccentric wheel E when the connecting rod G shall have been let down on to the crank axle C, being instantaneously connected therewith by a shoulder G' on the underside of the said connecting rod G, striking against the crank axle, and at the same time arresting the rotary motion of the wheels and axle to which the eccentric is applied. The eccentric E may be fixed to the middle of the car axle, or in any convenient part of it. The connecting rod is attached to it by a circular yoke of the usual construction. The connecting rod may be made in the form represented in Fig. 2, or in any other required form. The chain I by which it is raised and lowered may be attached to the connecting rod near its outer extremity, or in any convenient place, and conveyed over pulleys to the engineer, brakeman or other persons whose duty it may be to attend to it.

To operate this brake it is only necessary for the engineer, or brakeman to lay hold of the chain I and let down the connecting rod G until the shoulder G' is on a line with the crank C. The rotary motion of the eccentric E causes the connecting rod G, to move longitudinally and to bring the shoulder G' against the crank axle C and to turn the axle which brings the arms against the rubbers and vibrates them on the pins to which they are suspended and brings their concave surfaces against the peripheries of the wheels, thus arresting the rotary motion of the wheels and axle to which the eccentric is attached and causing the wheels to slip on the rails of the track and very soon to arrest the motion of the train. When it is required to disengage the connecting rod and crank axle it is only necessary to draw the chain I and raise the end of the connecting rod to which it is attached. This operation will disengage the shoulder G' from the crank axle C. The rubbers will then fall back from the wheels and assume their original positions. When the brake is not required to be in action the connecting rod G will be held suspended above the crank shaft and will move back and forth as the eccentric revolves.

By making the crank axle C sufficiently elastic and yielding at the middle the rotary motion of the eccentric may be uninterrupted. In this case the action of the rubbers on the wheels will be in quick succession first pressing against the wheels and then receding from them, caused by the alternate motion of the crank axle.

The crank axle and arms may be turned by attaching the connecting rod to a pin inserted into the outer side of the car wheel between its periphery and center and bringing it into, and raising it out of gear, with the crank shaft in the same manner as above described.

I do not claim the pendant rubbers nor the crank axle and arms for bringing the rubbers against the peripheries of the wheels, but What I do claim as my invention and desire to secure by Letters Patent, is—

The mode of turning the crank axle C to actuate the rubbers B by means of the combination and arrangement of the connecting rod G and eccentric wheels E with the axle K of the car to which the brake is applied as above set forth by which the engineer may cause the brake to act gradually, or instantaneously, and most effectually, at a moment's warning, for retarding or stopping the motion of the car.

In testimony whereof I have hereunto signed my name before two subscribing witnesses.

AMOS B. McFARLAN.

Witnesses:
L. WASHINGTON, Sr.,
WM P. ELLIOT.